Nov. 17, 1942.  E. SIEGLING  2,302,065
DRIVING BELT
Filed April 22, 1940    2 Sheets-Sheet 1
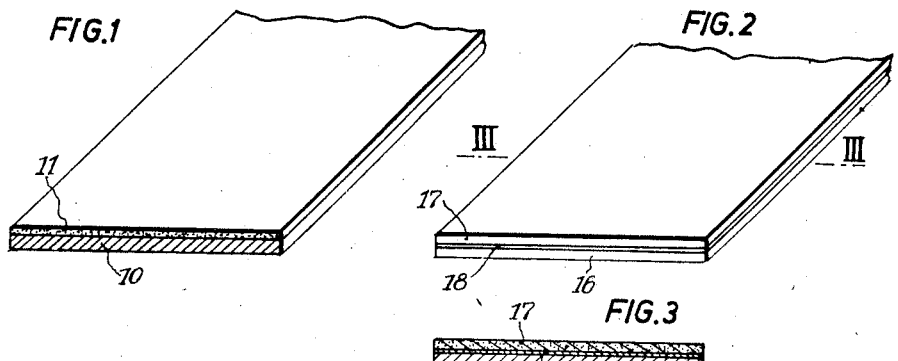
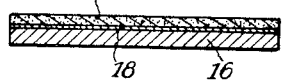
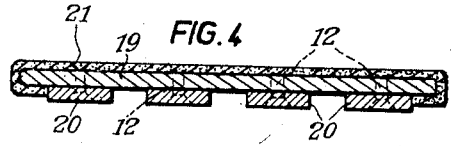
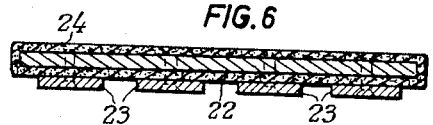
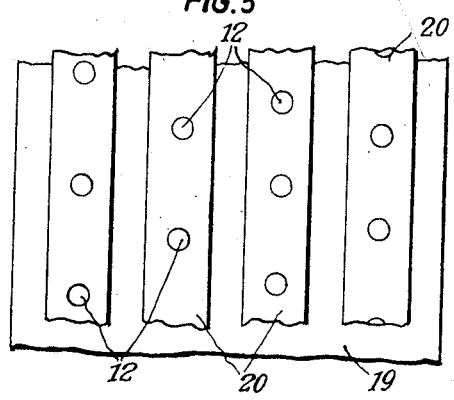
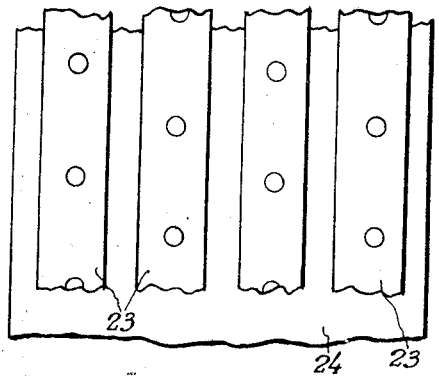
Inventor:
Ernst Siegling,
By Frank S. Appleman,
Attorney.

Nov. 17, 1942.  E. SIEGLING  2,302,065
DRIVING BELT
Filed April 22, 1940  2 Sheets-Sheet 2
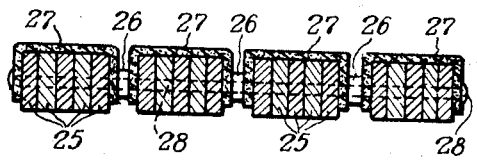
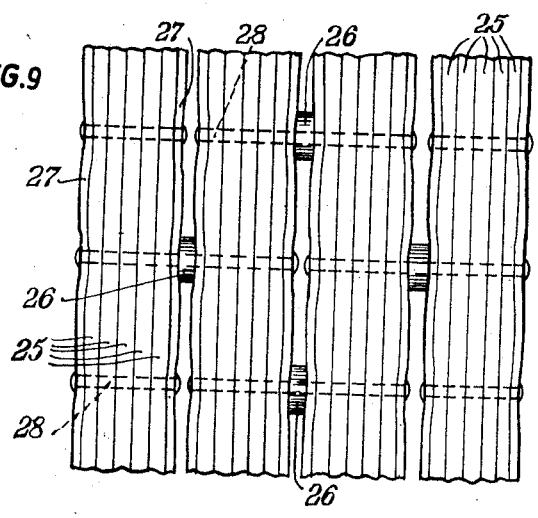
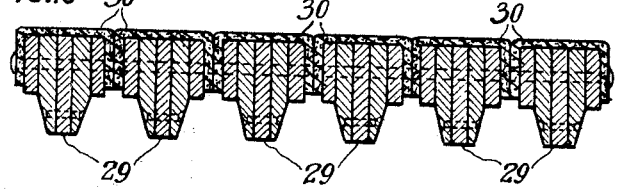
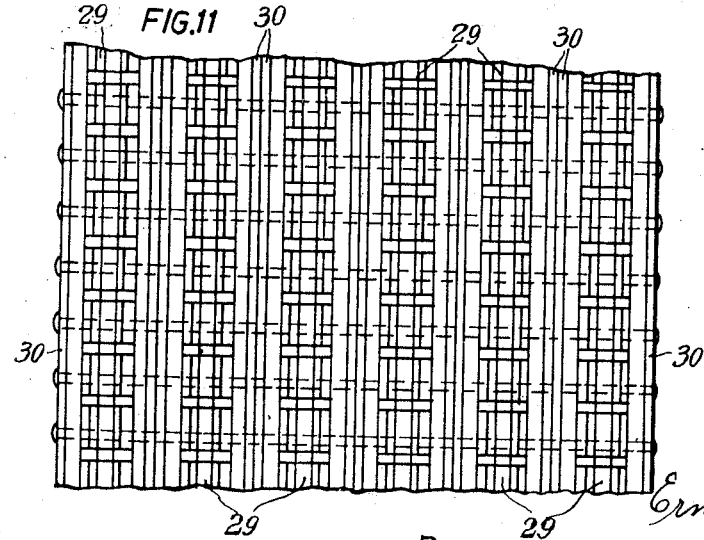

Patented Nov. 17, 1942

2,302,065

UNITED STATES PATENT OFFICE 2,302,065

DRIVING BELT

Ernst Siegling, Hanover, Germany; vested in the Alien Property Custodian

Application April 22, 1940, Serial No. 331,055 In Germany May 19, 1939

3 Claims. (Cl. 74—232)

When using ordinary driving belts, the latter are charged with static electricity. It is necessary to keep the electrical tension of such charging within narrow limits as, otherwise, spark discharges occur which can give rise to serious accidents in rooms exposed to risk of explosions. Hitherto, it has been sought to attain this purpose by applying metal bands or wires to the belts, with the idea of connecting, over the pulleys, the shafts and the bearings, the produced electricity with the earth. However, as there exists a difference of expansion between metal and the belt material, such suggestions are of no practical value. It also should be borne in mind that an earth connection of the electricity is not feasible in many cases where wooden pulleys are involved.

The present invention provides a driving belt which is always free from spark discharges, without necessity of connecting the electricity with the earth. According to the invention, the outer side of the driving belt is designed with a fibrous (capillaceous) layer. This layer preferably consists of a band of cotton-plush which is tightly connected to the driving belt. The fibrous layer produces a neutralisation of the belt electricity before the tension of the electrostatic charge can reach a dangerous height. The result obtained by the invention is based principally on the discharge of the electricity through the points of the fibrous layer. Another cooperative feature is the enlargement of the surface of the belt and its electrical capacity by the numberless fibres or hairs.

The effect pursued is attained in a particular degree by impregnating the outer layer of the driving belt with a hygroscopical substance. Owing to the hygroscopical substance, a thin layer of moisture is created upon the whole belt length which is electrically conductive. This gives rise to a rapid distribution, all over the length of the belt, of the electrical charge which is mainly produced at the two running off spots of the driving belt from the pulleys. The aforesaid film of moisture is maintained permanently in spite of evaporation and in spite of loss due to centrifugal force, any loss of moisture being made up for by withdrawal of water from the air through the action of the hygroscopical substance.

A mixture of glycerine and calcic chloride is specially adapted for such a hygroscopical substance.

In the drawings, some constructional forms of the invention are described in which—

Fig. 1 is the perspective view of a flat driving belt embodying the characteristics of the invention;

Fig. 2 is another constructional form of a flat driving belt according to the invention;

Fig. 3 is a section on the line III—III of Fig. 2;

Fig. 4 is the cross-section through a driving belt according to the invention having special strips laid on to increase the adhesion;

Fig. 5 is a bottom view of the driving belt shown in Fig. 4;

Fig. 6 is the cross-section through another constructional form of the driving belt;

Fig. 7 is a bottom view of the driving belt shown in Fig. 6;

Fig. 8 is the cross-section through a driving belt according to the invention when composed of edgewise arranged strips;

Fig. 9 is a bottom view of the driving belt shown in Fig. 8;

Fig. 10 is the cross-section through another constructional form of the driving belt;

Fig. 11 is a bottom view of the driving belt shown in Fig. 10;

The driving belt of Fig. 1 consists of the leather band 10 and of the cotton-plush band 11 which is fastened to the leather band in a suitable manner, as by gumming. The leather band 10 is in touch with the pulley, thus, the cotton-plush band 11 being on the outer side.

The driving belt of Figs. 2 and 3 is similar to the driving belt of Fig. 1. The only difference consists in the Celluloid layer 18 which is arranged between the leather band 16 and the cotton-plush band 17.

The driving belt of Figs. 4 and 5 is composed of the band 19, consisting of gummed textile fabric, which serves to transmit the pulling forces; furthermore, of the strips 20, consisting of chrome-leather, which are particularly adapted to produce a high adhesion to the periphery of the pulleys; and, finally, of the cotton-plush layer 21. The parts of the driving belt are connected to each other by tubular rivets 12.

The driving belt of Figs. 6 and 7 is similar to the driving belt of Figs. 4 and 5. Here, the band 22 is completely wrapped by the cotton-plush band 24. Consequently, cotton-plush is also between the band 22 and the strips 23 which are in contact with the pulleys.

The driving belt of Figs. 8 and 9 consists of the edgewise arranged strips 25 made of leather or the like which are held together by the bolts 28. Several groups of strips 25 are formed which are kept in distance from each other by washers 26. Each group of strips is surrounded, on the outside and at the lateral sides, by a cotton-plush band 27.

The driving belt of Figs. 10 and 11 mainly differs from the driving belt of Figs. 8 and 9 by the fact that each group of strips has the shape of a wedge 29 which when running over the pulleys, in cooperation with a wedge-shaped profiled rim, give the well-known effect of a V-belt.

The invention relates to driving belts of bark-tanned leather, chrome-leather, rubber or textile fabrics as well as to driving belts made of gummed or balata or impregnated fabrics.

The outer layer of the belt serving to neutralize the electrostatic charging can also be made of a hide instead of cotton-plush felt or many other textile or woven goods. In some cases, also driving belts of cow-hides may be used the natural hairiness of which has been preserved when tanning.

Rivets and clamps can be used for connecting the belt parts; the parts can also be sewed or glued together.

I claim:

1. A driving belt having at its working face a layer which is adapted to transmit power between the peripheries of the pulleys and the belt, and having at its outer face a superimposed fibrous and pilose layer, tightly connected to said first layer and impregnated by a mixture of glycerine and calcic chloride.

2. A driving belt having at its working face a layer which is adapted to transmit power between the peripheries of the pulleys and the belt, and having at its outer face a superimposed layer of cotton plush, tightly connected to said first layer and impregnated by a mixture of glycerine and calcic chloride.

3. A driving belt having at its working face a layer which is adapted to transmit power between the peripheries of the pulleys and the belt, and having at its outer face a superimposed layer of cotton plush, tightly connected to said first layer and impregnated by a mixture of glycerine and calcic chloride, the two layers being separated from one another by an intermediate layer impermeable to moisture.

ERNST SIEGLING.